United States Patent
Khan et al.

(10) Patent No.: US 11,188,450 B2
(45) Date of Patent: Nov. 30, 2021

(54) CLOUD APPLICATION ARCHITECTURE USING EDGE COMPUTING

(71) Applicant: SAP SE, Walldorf (DE)

(72) Inventors: Mazhar Khan, Rampur/Uttar Pradesh (IN); Pratyush Shukla, Kanpur (IN); Shivankit Bisht, Ghaziabad UP (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/838,818

(22) Filed: Apr. 2, 2020

(65) Prior Publication Data
US 2021/0311855 A1    Oct. 7, 2021

(51) Int. Cl.
| G06F 11/36 | (2006.01) |
| H04L 29/08 | (2006.01) |
| G06F 8/61 | (2018.01) |

(52) U.S. Cl.
CPC ............ *G06F 11/3664* (2013.01); *G06F 8/63* (2013.01); *G06F 11/362* (2013.01); *H04L 67/10* (2013.01)

(58) Field of Classification Search
CPC ...... G06F 8/63; G06F 11/362; G06F 11/3664; H04L 67/10
See application file for complete search history.

(56) References Cited

U.S. PATENT DOCUMENTS

| 10,719,744 B2* | 7/2020 | Smith ................. G06K 9/00624 |
| 10,855,625 B1* | 12/2020 | Viswanathan .......... H04L 51/18 |
| 10,917,470 B1* | 2/2021 | Zhuravlev ............. G06F 3/0617 |
| 10,936,238 B2* | 3/2021 | Power .................... G06F 3/0604 |
| 2014/0237451 A1* | 8/2014 | Koneru ............... G06F 3/04842 717/124 |
| 2017/0147813 A1* | 5/2017 | McPherson ............. G06F 21/50 |
| 2018/0157505 A1* | 6/2018 | Kairali .................. H04L 41/069 |
| 2018/0300499 A1* | 10/2018 | Agarwal ............. G06F 21/6245 |
| 2019/0138287 A1* | 5/2019 | De Capoa ........... G06F 9/44505 |
| 2019/0361697 A1* | 11/2019 | Hu ...................... G06F 11/3051 |
| 2020/0028800 A1* | 1/2020 | Strathman ............. H04L 69/326 |
| 2020/0050494 A1* | 2/2020 | Bartfai-Walcott ..... G06F 9/5083 |
| 2020/0067789 A1* | 2/2020 | Khuti .................... G06F 16/254 |

(Continued)

FOREIGN PATENT DOCUMENTS

| EP | 3683675 A1 * | 7/2020 | ............... G06F 8/60 |
| JP | 2018077882 A * | 5/2018 | ............. G06F 3/017 |
| WO | WO-2020231952 A1 * | 11/2020 | ............. G06F 9/455 |

OTHER PUBLICATIONS

Bae et al., "Automated Deployment of SmartX IoT-Cloud Services based on Continuous Integration", 2016, IEEE (Year: 2016).*

(Continued)

*Primary Examiner* — Wei Y Zhen
*Assistant Examiner* — Junchun Wu
(74) *Attorney, Agent, or Firm* — Erise IP, P.A.

(57) ABSTRACT

Systems, methods, and computer program products are described for edge computing for cloud application development. Data having at least one image of a continuous integration system is received. The at least one image can be locally instantiated within a local container. Developmental code associated with an application can be retrieved from a code repository. The application is compiled, built, and tested within the local container based on the developmental code. The application is deployed to a production environment.

20 Claims, 8 Drawing Sheets

(56) References Cited

U.S. PATENT DOCUMENTS

2020/0348662 A1\* 11/2020 Cella .................... G05B 23/024
2020/0364039 A1\* 11/2020 Gibbs ................. G06F 9/45558

OTHER PUBLICATIONS

Meixner et al., "Automatic Application Placement and Adaptation in Cloud-Edge Environments", 2019, IEEE (Year: 2019).\*
Sabella et al., "Edge Computing: from standard to actual infrastructure deployment and software development", Oct. 2019, Intel (Year: 2019).\*
Rathod et al., "Test Orchestration a framework for Continuous Integration and Continuous Deployment", 2015, ICPC (Year: 2015).\*

\* cited by examiner

CLOUD APPLICATION ARCHITECTURE USING EDGE COMPUTING

TECHNICAL FIELD

The subject matter described herein relates to enhanced techniques for edge computing for cloud application development.

BACKGROUND

Software developers utilize continuous integration systems to manage, build, and/or test developmental software code. Such systems can be shared by a number of software developers in a centralized, remote location. This architecture can result in lagging or slow response times, causing a bottleneck during software development. In other words, such an architecture can increase the end to end software development times.

SUMMARY

In one aspect, a method of edge computing for cloud application development is implemented by one or more data processors forming one or more computing devices. Data having at least one image of a continuous integration system is received. The at least one image is locally instantiated within a local container. Developmental code associated with an application is retrieved from a code repository. The application is compiled, build, and tested within the local container based on the developmental code. The application is deployed to a production environment.

In some variations, a container image configuration file can be generated. The container image configuration file can include (i) executable commands for retrieving the at least one image of the continuous integration system and (ii) one or more build configuration parameters associated with the building of the application.

In other variations, the executable commands can be executed within the container image configuration file results in the retrieving of the at least one image.

In some variations, the testing can include at least one of unit testing or code error testing.

In other variations, the at least one image can include a node image, a build automation tool image, or a continuous integration image.

In some variations, one or more dependencies associated with the container image can be cached within the continuous integration system.

In other variations, the local container can operate on a developer computing system.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter eliminates a centralized build and/or test environment and reduces bottlenecks associated with a single point of failure. Use of the current subject matter can decrease the amount of time it takes to build, test, and deploy an application. The system architecture described herein also makes the application deployment process more resilient as the single point of failure (e.g., the centralized build/test environment) is removed.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

A system architecture is described herein which combines edge computing with a container-based technology to enable local integration development and testing of developmental software code. The architecture described herein includes a local copy of a continuous integration system stored on a developer/user computer. A container is used to build and/or test developmental software code prior to deploying the software, such as an application to a target environment.

Figure 1:
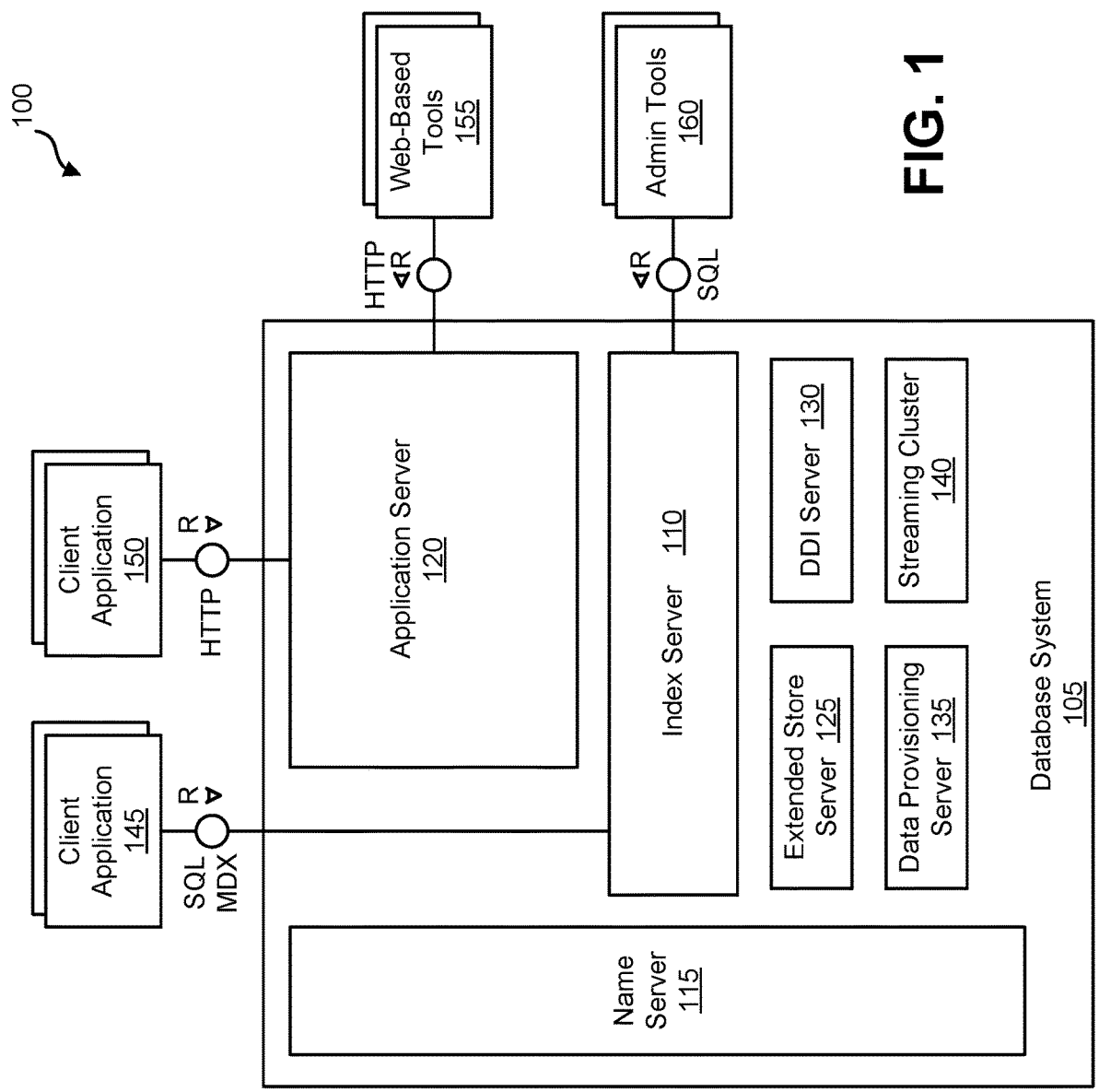
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk input/output (I/O) and in which disk storage is required to make any changes durable. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also be used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter software development kit (SDK) for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
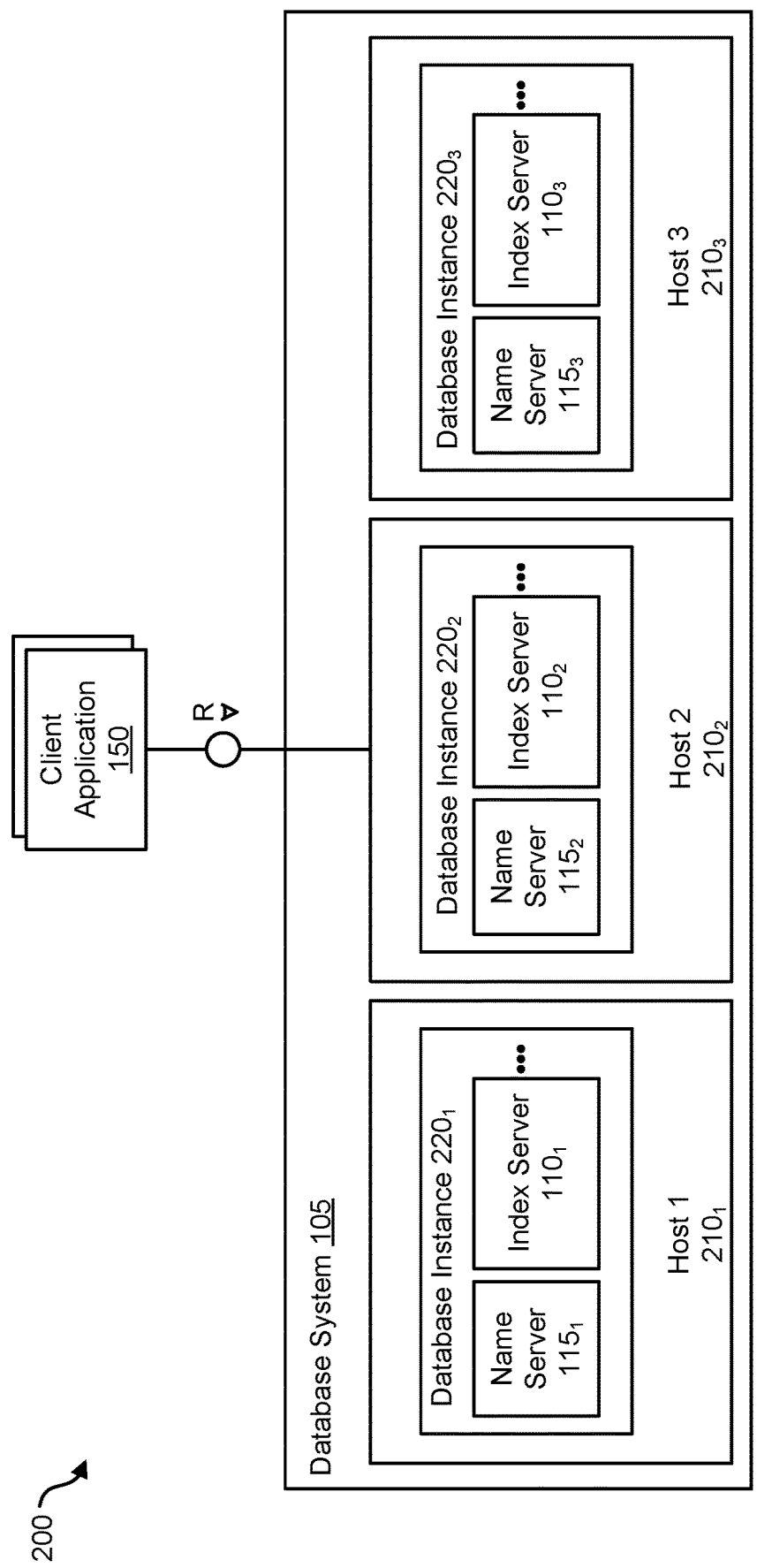
FIG. 2 is a system diagram illustrating a distributed database system having a plurality of database instances.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 150 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Figure 3:
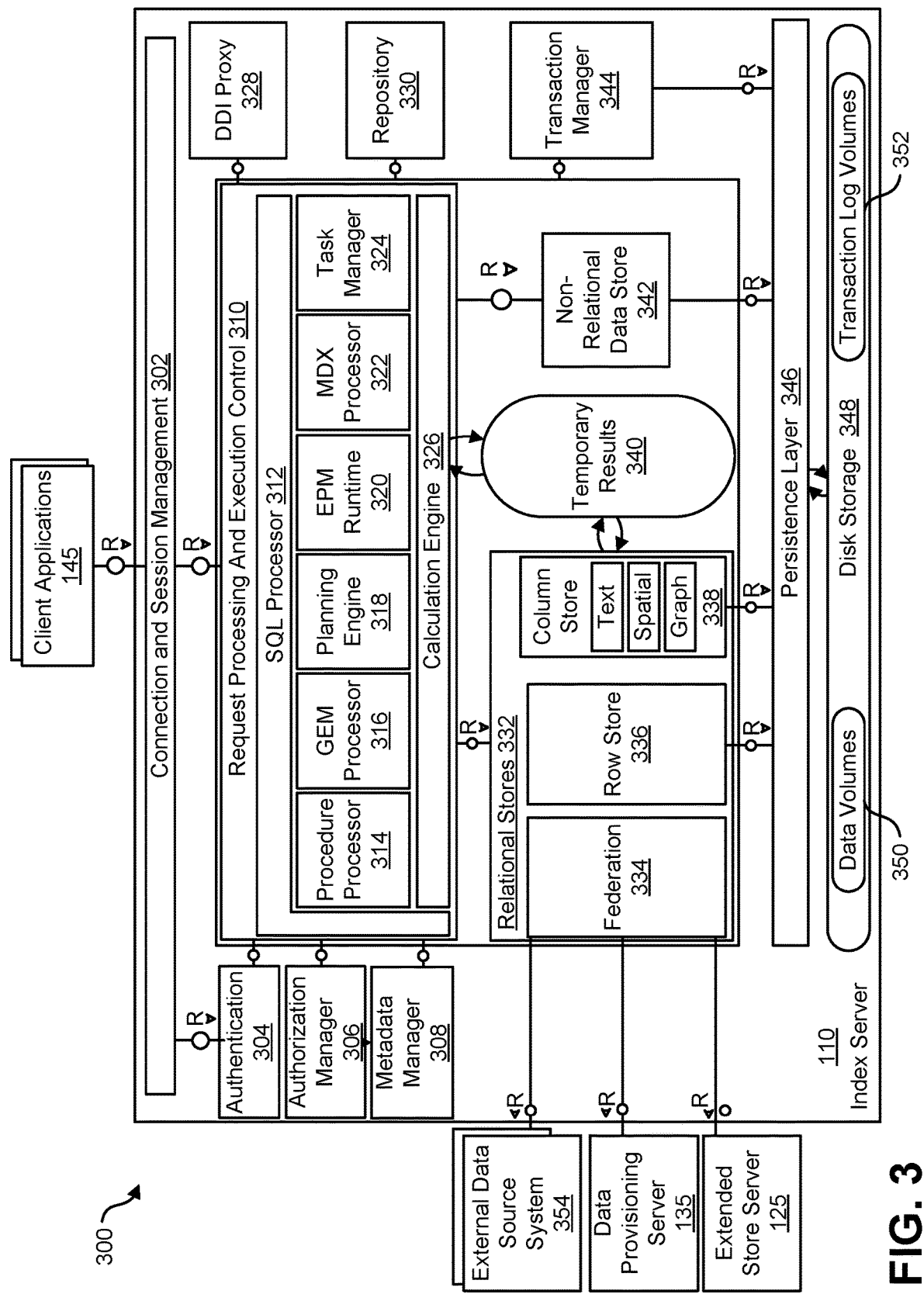
FIG. 3 is a system diagram of an index server forming part of the database system of FIG. 1.

FIG. 3 is a diagram 300 illustrating an architecture for the index server 110 (which can, as indicated above, be one of many instances). A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 145 is established. Users can be authenticated either by the database system 105 itself (login with user and password) or authentication can be delegated to an external authentication provider. An authorization manager 306 can be invoked by other components of the database system 105 to check whether the user has the required privileges to execute the requested operations.

Each statement can be processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can be forwarded to a task manager 324 (which can be part of a larger task framework). Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 306. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 306 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph application program interface (API).

The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extend transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and save points. The persistence layer 346 can provide interfaces for writing and reading persisted data and it can also contain a logger component that manages a recovery log. Recovery log entries can be written in the persistence layer 348 (e.g., in recovery log volumes 352) explicitly by using a log interface or implicitly when using the virtual file abstraction. The recovery log volumes 352 can include redo logs which specify database operations to be replayed whereas data volume 350 can contain undo logs which specify database operations to be undone as well as cleanup logs of committed operations which can be executed by a garbage collection process to reorganize the data area (e.g., free up space occupied by deleted data, etc.).

The persistence layer 346 stores data in persistent disk storage 348 which, in turn, can include data volumes 350 and/or transaction log volumes 352 that can be organized in pages. Different page sizes can be supported, for example, between 4 k and 16 M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

Figure 4:
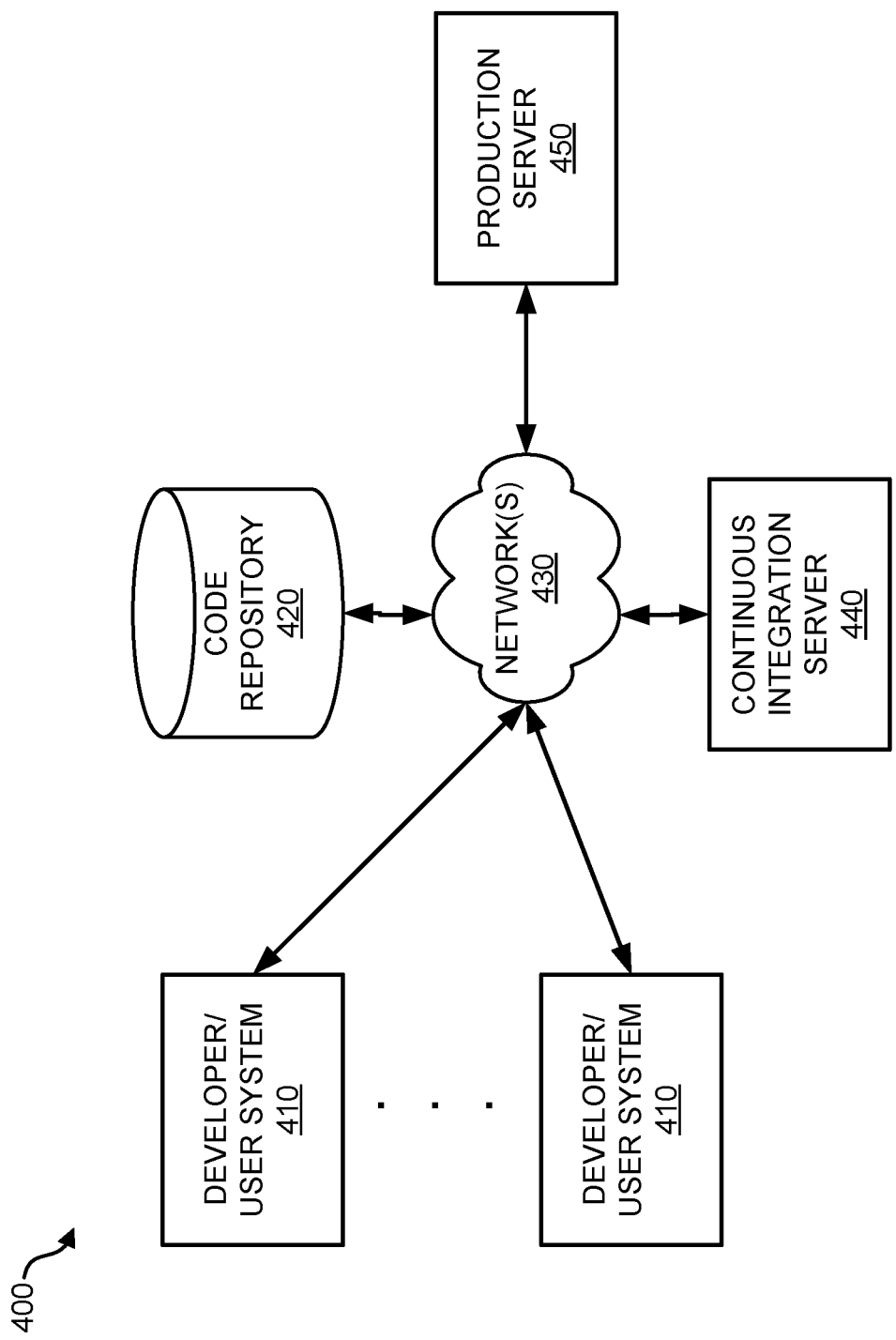
FIG. 4 illustrates an example architecture for developing and deploying an application using a remote, centralized server for continuous integration.

FIG. 4 illustrates an example architecture 400 for developing and deploying an application using a remote, centralized server for continuous integration. With continuous integration, software development teams implement small changes and check in code to version control repositories often. Continuous delivery automates deployment to selected infrastructure environments. In some cases, developers work on multiple deployment environments such as production, development, and/or testing. The deployment in these spaces happens via centralized continuous integration servers 440. Any performance impact on these servers 440 can impact many aspects of the software development and/or deployed software products such as applications.

A developer or user can design an application by writing source code using developer/user system 410. That source code can be transmitted to a code repository 420 for storage. Code repository 420 can also compile source code from any number of developer/user systems 410. Continuous integration server 440 can be a remote server that build and/or test applications based on the source code compiled in code repository 420. Code repository 420 and continuous integration server 440 can each be a computing system that can exchange data and/or commands or other instructions or the like via one or more connections, including but not limited to a connection over a network 430 (e.g., the Internet, a wireless wide area network, a local area network, a wide area network, a wired network, or the like), via a direct connection between one or more of the multiple computing systems, etc. The continuous integration server 440 can pull relevant code for a given application development or test from code repository 420. Continuous integration server can exchange data and/or commands or other instructions or the like with a production server 450. Such exchange, for example, can be a deployed build of an application built and/or tested by continuous integration server 440. Use of a continuous integration server 440, however, can be prone to slow application build times and/or high deployment times for application.

Figure 5:
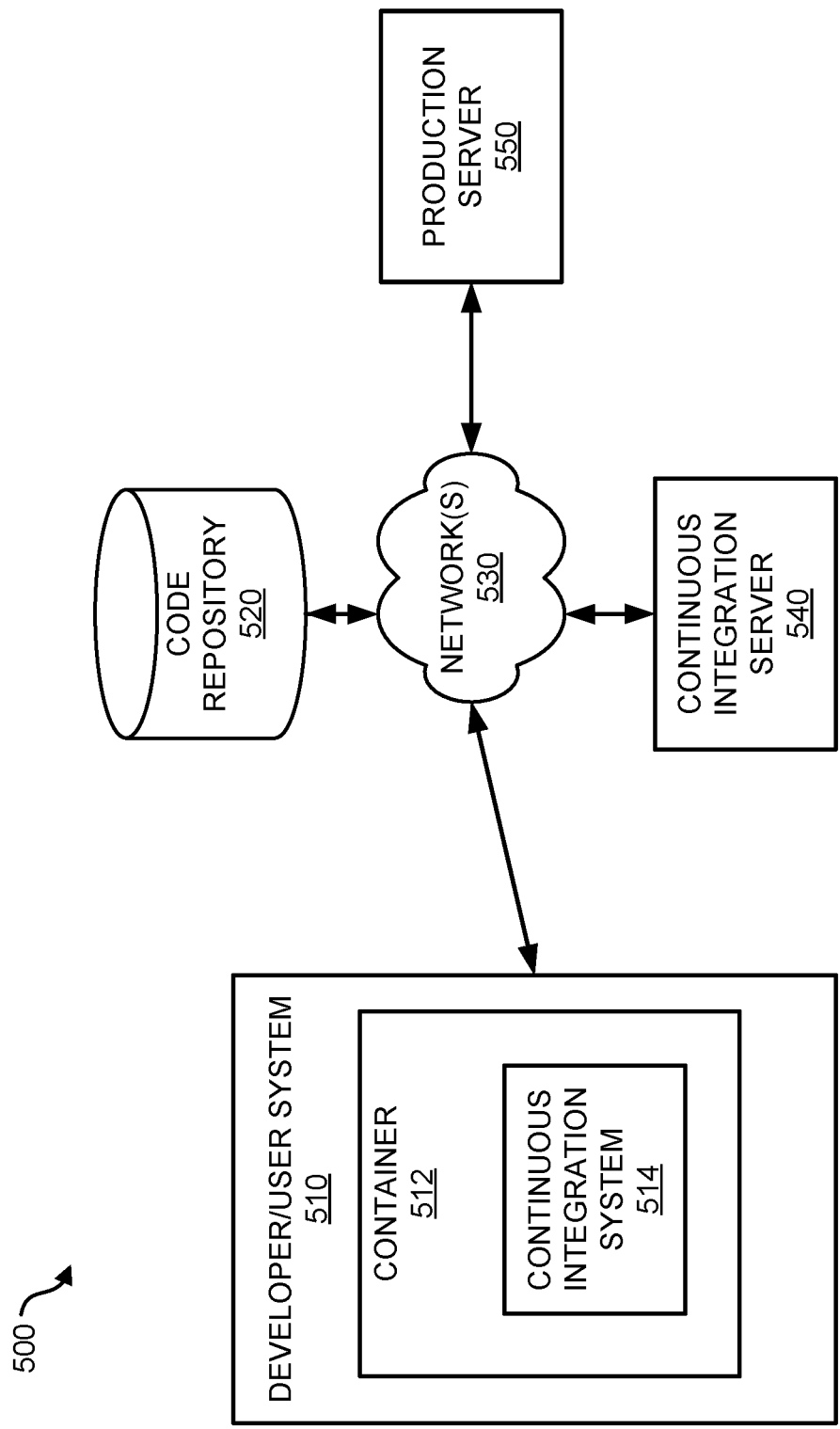
FIG. 5 illustrates another example architecture for developing and deploying an application using a developer/user system having a local copy of the functionality associated with the continuous integration server.

Edge computing shifts the paradigm from centralized to decentralized; by utilizing computer network and storage resources that is closer to the software developer system. Edge computing can greatly improve user experience by eliminating the dependency on central infrastructure failure or snap of network connectivity to it by bringing more control to the end-user. FIG. 5 illustrates an example edge computing architecture 500 for developing and deploying an application using a developer/user system 510 having a local copy of the functionality associated with the continuous integration server 540. An image of the continuous integration server 540 is taken (e.g., continuous integration system 514) and transmitted to the developer/user system 510.

The developer/user system 510 includes a locally hosted container 512. Containers are a form of operating system (OS) virtualization where the operating system resources, memory, and services required to run an application or service are packaged inside a box. The isolation, reduced size, quick setup, and tearing down provided by the containers can be used to run applications on edge where there is dependency on the central infrastructure. The continuous integration system 514 operates within the locally hosted container 512. The locally hosted container 512 pulls code from the code repository 520 relevant to the development of a particular application. Building of the application using that pulled code can be performed by the locally hosted container 512. Code quality checks (e.g., code unit testing, error checks, etc.) performed during application testing can also be performed by container 520. Such checks and any other relevant testing can be performed prior to deploying a built application to production server 550. Once tested, the application can be deployed from the developer/user system 510 to the production server 550. Use of the architecture 500 can bypass dependency on the continuous integration server 540 as the functionality is integrated within the developer/user system 510 (e.g., within container 512).

Figure 6:
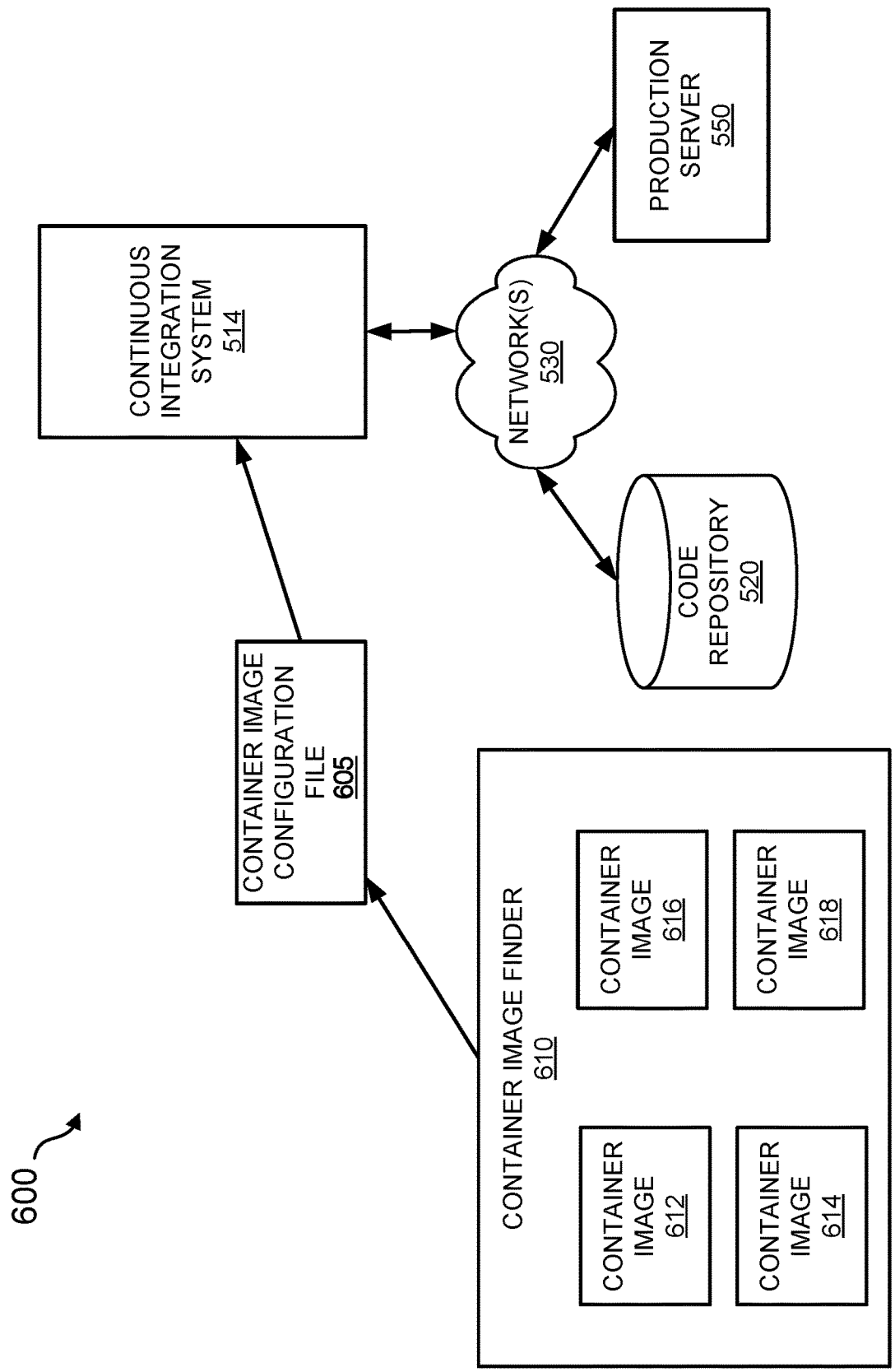
FIG. 6 is an example implementation block diagram illustrating interactions between the continuous integration system and various aspects of the architecture of FIG. 5.

FIG. 6 is an example implementation block diagram 600 illustrating interactions between the continuous integration system 514 and various aspects of architecture 500 of FIG. 5. A container image finder 610 can store a number of container images 612, 614, 616, 618. Container images 612, 614, 616, 618 can include, for example, node images, build automation tool images, and/or continuous integration images. A container image configuration file 605 can contain executable commands for pulling one or more of the container images 612, 614, 616, 618 and deliver the selected images to continuous integration system. In other words, when the contents of the container image configuration file 605 are executed, one or more of the container images 612, 614, 616, 618 are pulled from container image finder 610 and provided to the continuous integration system 514. In addition to executable commands, the container image configuration file can include a number of configuration parameters associated with develop of a particular build such as relevant system properties or environment variables. The continuous integration system 514 can then begin to operate (e.g., initiate operation) by loading the pulled image or images. A job can trigger pulling of code from the code repository 520 relevant for developing, building, and/or testing a particular software product such as an application. Code quality checks (e.g., code unit testing, error checks, etc.) can be performed on the pulled code from code repository 520. After building and/or testing are completed on the pulled code, then the software product can be deployed to a production server 550. Data and/or commands or other instructions or the like can be exchanged between container image finder 610, continuous integration system 514, code repository 520, and/or production server 550 via one or more connections, including but not limited to a connection over a network 430 (e.g., the Internet, a wireless wide area network, a local area network, a wide area network, a wired network, or the like), via a direct connection between one or more of the multiple computing systems, etc. Such data, commands, and/or other instructions associated with a deployed software product such as an application can be cached within the continuous integration system 514. For every new software build triggered by the continuous integration system 514, dependencies between the one or more pulled images can be re-used. Such re-use can speed up the processing time for building, testing, and/or deploying a new software product.

Figure 7:
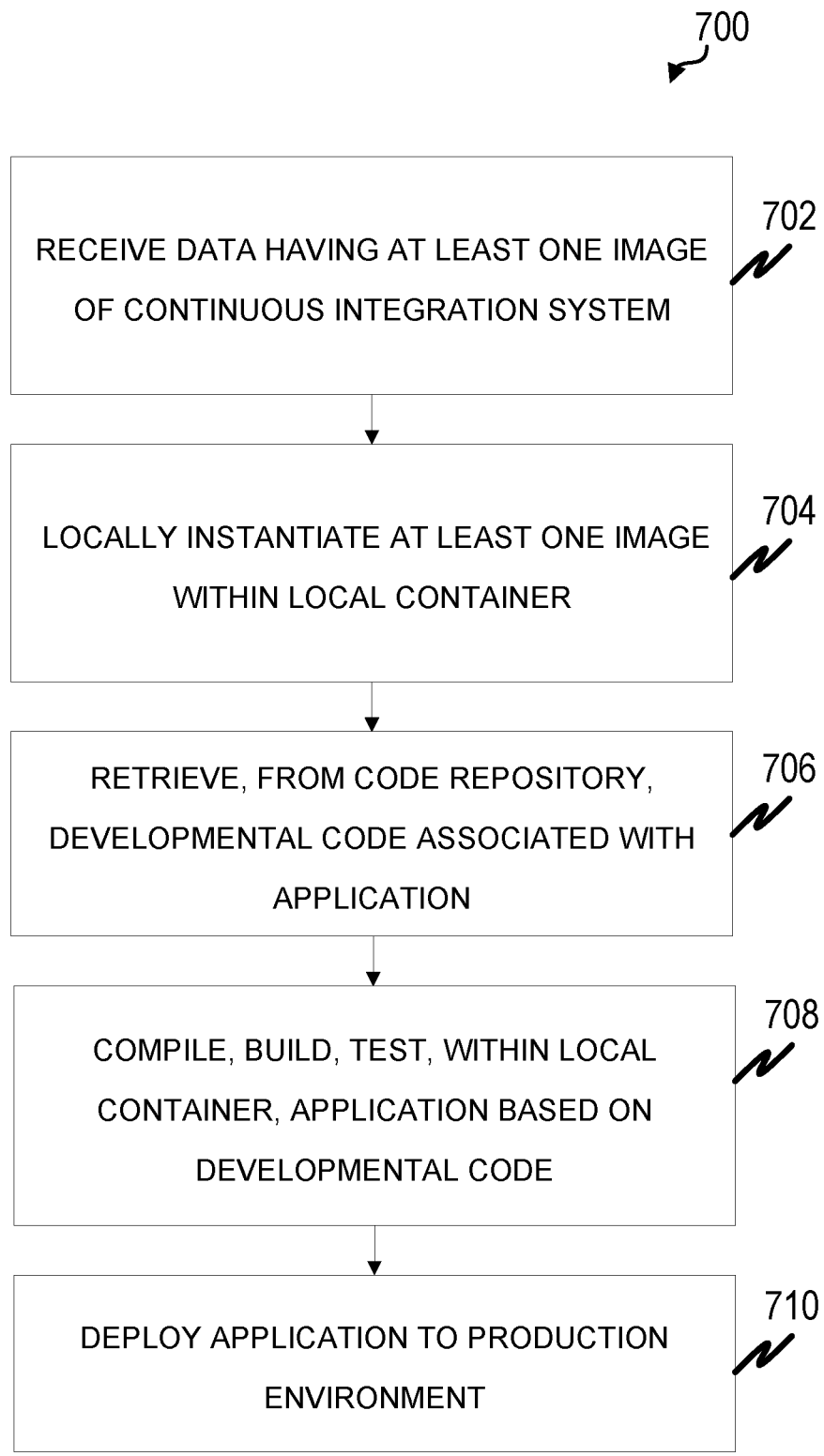
FIG. 7 illustrates an example flow diagram for a method of edge computing for cloud application development implemented by one or more data processors forming one or more computing devices.

FIG. 7 illustrates an example flow diagram 700 for a method of edge computing for cloud application development implemented by one or more data processors forming one or more computing devices. Data having at least one image of a continuous integration system is received, at 702. The at least one image is locally instantiated, at 704, within a local container. Developmental code associated with an application is retrieved, at 706, from a code repository. Within the local container, the application is compiled, built, and tested, at 708, based on the developmental code. The application which is built and tested is deployed, at 710, to a production environment.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 8:
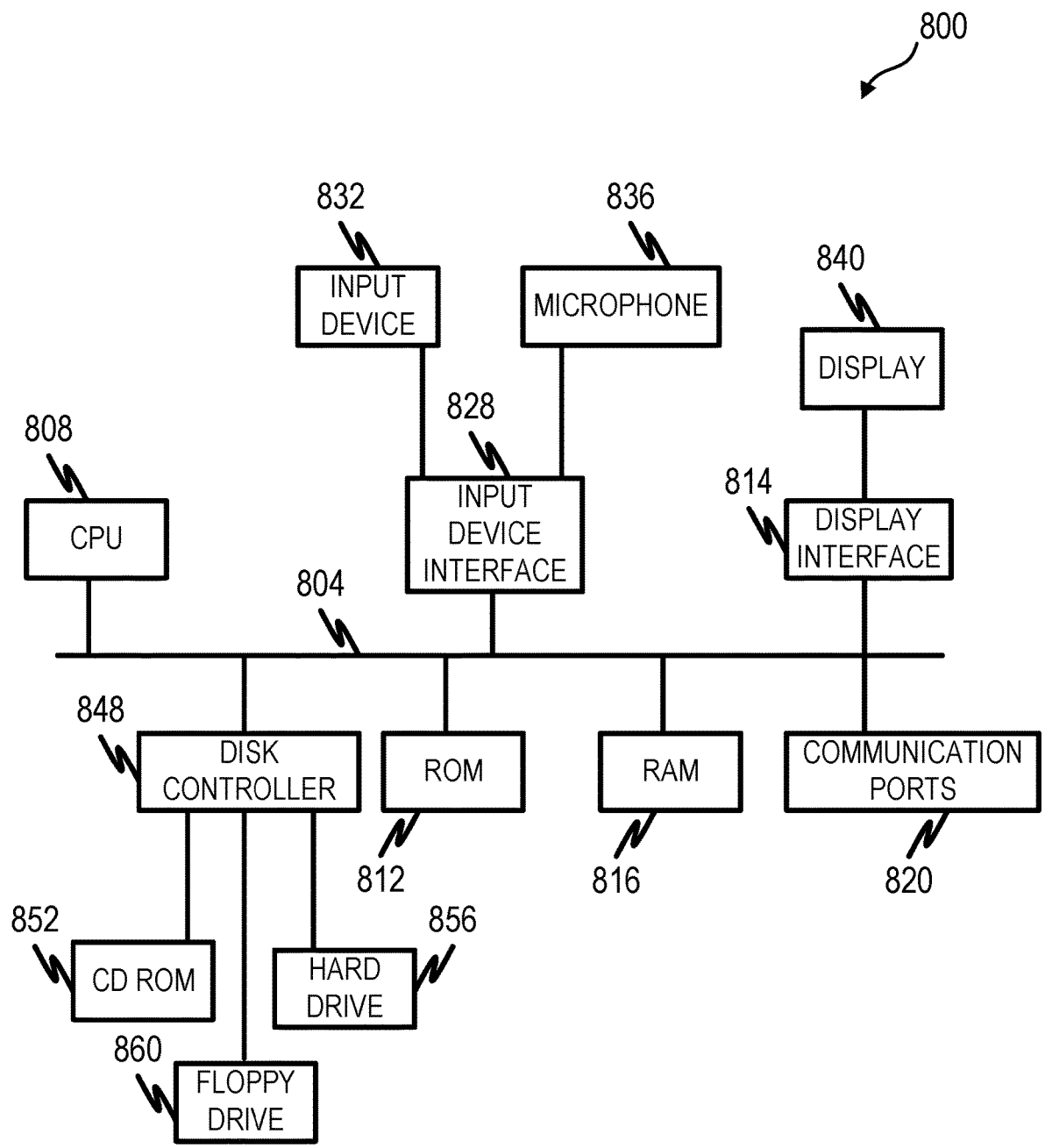
FIG. 8 is a diagram illustrating a sample computing device architecture for implementing various aspects described herein.

FIG. 8 is a diagram 800 illustrating a sample computing device architecture for implementing various aspects described herein. A bus 804 can serve as the information highway interconnecting the other illustrated components of the hardware. A processing system 808 labeled CPU (central processing unit) (e.g., one or more computer processors/data processors at a given computer or at multiple computers), can perform calculations and logic operations required to execute a program. A non-transitory processor-readable storage medium, such as read only memory (ROM) 812 and random access memory (RAM) 816, can be in communication with the processing system 808 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 848 can interface one or more optional disk drives to the system bus 804. These disk drives can be external or internal floppy disk drives such as 860, external or internal CD-ROM, CD-R, CD-RW or DVD, or solid state drives such as 852, or external or internal hard drives 856. As indicated previously, these various disk drives 852, 856, 860 and disk controllers are optional devices. The system bus 804 can also include at least one communication port 820 to allow for communication with external devices either physically connected to the computing system or available externally through a wired or wireless network. In some cases, the communication port 820 includes or otherwise comprises a network interface.

To provide for interaction with a user, the subject matter described herein can be implemented on a computing device having a display device 840 (e.g., a CRT (cathode ray tube) or LCD (liquid crystal display) monitor) for displaying information obtained from the bus 804 to the user and an input device 832 such as keyboard and/or a pointing device (e.g., a mouse or a trackball) and/or a touchscreen by which the user can provide input to the computer. Other kinds of input devices 832 can be used to provide for interaction with a user as well; for example, feedback provided to the user can be any form of sensory feedback (e.g., visual feedback, auditory feedback by way of a microphone 836, or tactile feedback); and input from the user can be received in any form, including acoustic, speech, or tactile input. In the input device 832 and the microphone 836 can be coupled to and convey information via the bus 804 by way of an input device interface 828. Other computing devices, such as dedicated servers, can omit one or more of the display 840 and display interface 814, the input device 832, the microphone 836, and input device interface 828.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an un-recited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method of edge computing for cloud application development implemented by one or more data processors forming one or more computing devices, the method comprising:
   receiving data comprising at least one image of a continuous integration system;
   locally instantiating the at least one image of the continuous integration system within a local container;
   retrieving, from a code repository, developmental code associated with an application;
   compiling, building, and testing, within the local container, the application based on the developmental code,
   wherein dependencies of the application are re-used when a new application build is triggered by the continuous integration system; and
   deploying the application to a production environment.

2. The method of claim 1, further comprising generating a container image configuration file comprising (i) executable commands for retrieving the at least one image of the continuous integration system and (ii) one or more build configuration parameters associated with the building of the application.

3. The method of claim 2, further comprising executing the executable commands within the container image configuration file resulting in retrieving of the at least one image.

4. The method of claim 1, wherein the testing comprises at least one of unit testing or code error testing.

5. The method of claim 1, wherein the at least one image comprises a node image, a build automation tool image, or a continuous integration image.

6. The method of claim 1, further comprising caching one or more dependencies associated with the at least one container image within the continuous integration system.

7. The method of claim 1, wherein the local container operates on a developer computing system.

8. A system of edge computing for cloud application development, the system comprising:
   at least one data processor; and
   memory storing instructions, which when executed by the at least one data processor, results in operations comprising:
      receiving data comprising at least one image of a continuous integration system;
      locally instantiating the at least one image of the continuous integration system within a local container;
      retrieving, from a code repository, developmental code associated with an application;
      compiling, building, and testing, within the local container, the application based on the developmental code,
      wherein dependencies of the application are re-used when a new application build is triggered by the continuous integration system; and
      deploying the application to a production environment.

9. The system of claim 8, wherein the operations further comprise generating a container image configuration file comprising (i) executable commands for retrieving the at least one image of the continuous integration system and (ii) one or more build configuration parameters associated with the building of the application.

10. The system of claim 9, further comprising executing the executable commands within the container image configuration file resulting in retrieving of the at least one image.

11. The system of claim 8, wherein the testing comprises at least one of unit testing or code error testing.

12. The system of claim 8, wherein the at least one image comprises a node image, a build automation tool image, or a continuous integration image.

13. The system of claim 8, further comprising caching one or more dependencies associated with the at least one container image within the continuous integration system.

14. The system of claim 8, wherein the local container operates on a developer computing system.

15. A non-transitory computer program product storing instructions which, when executed by at least one data processor forming part of at least one computing device, implement operations comprising:

receiving data comprising at least one image of a continuous integration system;

locally instantiating the at least one image of the continuous integration system within a local container;

retrieving, from a code repository, developmental code associated with an application;

compiling, building, and testing, within the local container, the application based on the developmental code, wherein dependencies of the application are re-used when a new application build is triggered by the continuous integration system; and deploying the application to a production environment.

16. The non-transitory computer program product of claim 15, wherein the operations further comprise (a) generating a container image configuration file comprising (i) executable commands for retrieving the at least one image of the continuous integration system, (ii) one or more build configuration parameters associated with the building of the application, and (b) executing the executable commands within the container image configuration file resulting in retrieving of the at least one image.

17. The non-transitory computer program product of claim 15, wherein the testing comprises at least one of unit testing or code error testing.

18. The non-transitory computer program product of claim 15, wherein the at least one image comprises a node image, a build automation tool image, or a continuous integration image.

19. The non-transitory computer program product of claim 15, wherein the operations further comprise caching one or more dependencies associated with the at least one container image within the continuous integration system.

20. The non-transitory computer program product of claim 15, wherein the local container operates on a developer computing system.

* * * * *